Dec. 22, 1970     R. J. BLACKMAN     3,548,478
FILM CARTRIDGE OPENING DEVICE
Filed Sept. 27, 1968     3 Sheets-Sheet 1
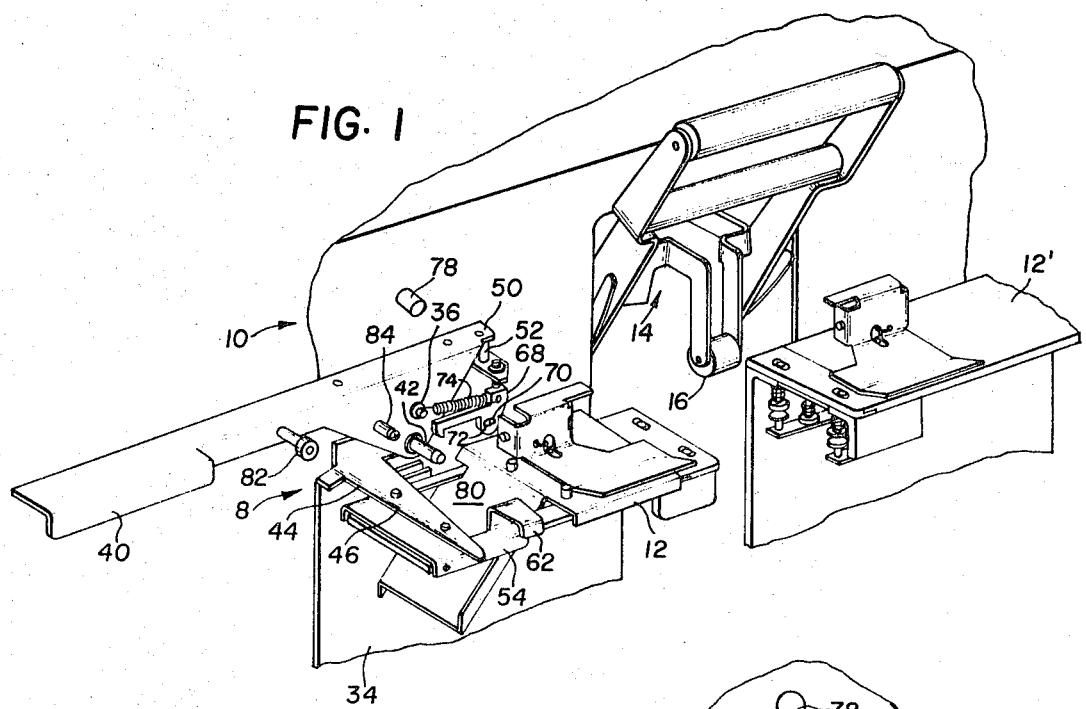
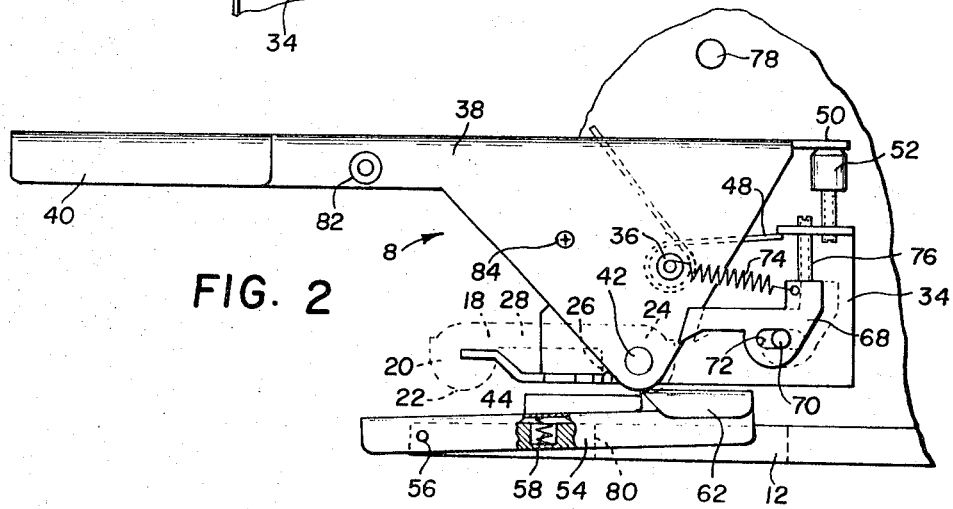
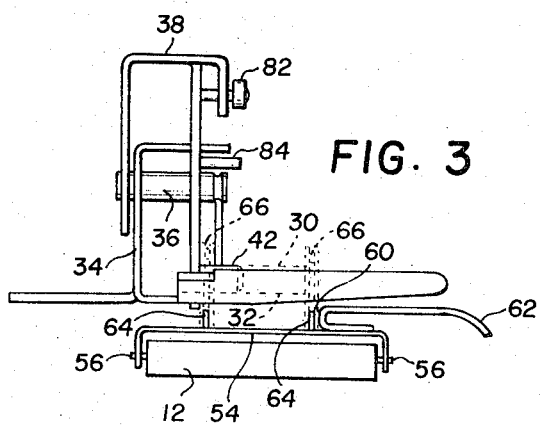
ROBERT J. BLACKMAN
INVENTOR.
BY
ATTORNEYS Dec. 22, 1970  R. J. BLACKMAN  3,548,478
FILM CARTRIDGE OPENING DEVICE
Filed Sept. 27, 1968  3 Sheets-Sheet 2

ROBERT J. BLACKMAN
INVENTOR.

BY *Steve W. Greenbaum*
*Robert W. Hampton*
ATTORNEYS

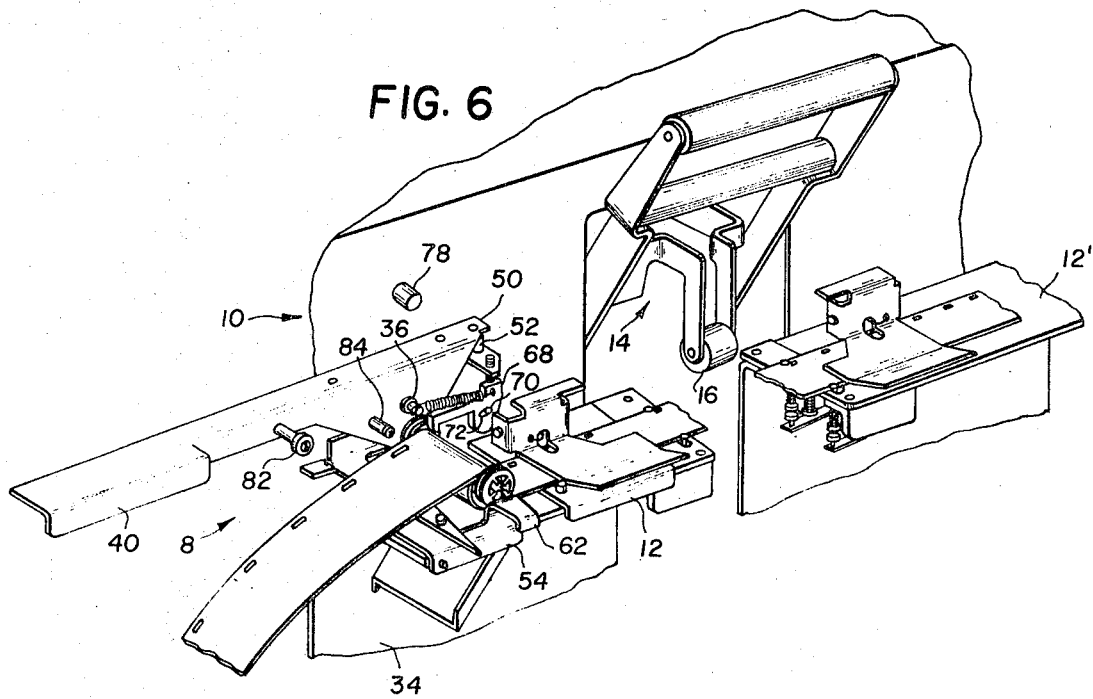
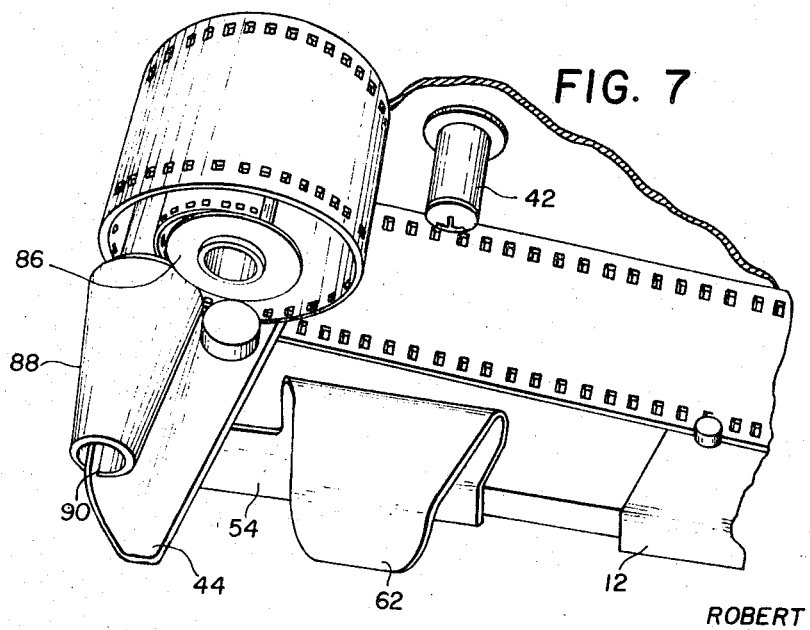

United States Patent Office 3,548,478
Patented Dec. 22, 1970

3,548,478
FILM CARTRIDGE OPENING DEVICE
Robert J. Blackman, Rochester, N.Y., assignor to Eastman Kodak Company, Rochester, N.Y., a corporation of New Jersey
Filed Sept. 27, 1968, Ser. No. 763,230
Int. Cl. B23p 19/04; B65h 35/00
U.S. Cl. 29—200          10 Claims

ABSTRACT OF THE DISCLOSURE

A device for breaking open a film cartridge to obtain a film spool contained therein, separating the film spool from the broken cartridge parts, disposing of the cartridge parts, and retaining the film spool on the device in a position for unwinding of the film and backing paper in preparation for splicing. By use of an adapter, the device will position a different size film spool for unwinding the film in preparation for splicing.

BACKGROUND OF THE INVENTION

This invention relates generally to film cartridges, and more specifically to a device for opening a film cartridge to obtain the film spool contained therein, and retaining the film spool in position for unwinding of the film.

With the advent of the film cartridge, a need arose for reliable film cartridge opening devices operable under dark room conditions for opening the film cartridge to obtain the film spool contained therein, and positioning the film spool to facilitate unwinding of the film and backing paper in preparation for splicing and processing. Heretofore, it has been necessary for photofinishers, under dark room conditions, to break the cartridge open, manually remove the film spool contained therein, manually hold the film spool with one hand while unwinding the film and backing paper with the other, and then splice the leading end to the trailing end of a prior film strip in preparation for processing. This has been difficult to accomplish without the operator, film and backing paper becoming entangled resulting in possible damage to the film. With the use of the cartridge opening device of this invention, it is possible to accomplish all of the aforementioned cartridge handling steps with a minimum of effort, and without damage to the film.

SUMMARY OF THE INVENTION

This invention includes within its scope a film cartridge opening device for breaking a cartridge open to obtain the film spool contained therein, for disposing of the broken cartridge parts, and for retaining the film spool in position to permit unwinding of the film and backing paper in preparation for splicing. The cartridge involved is of the normal type having a film supply chamber at one end, a film take-up chamber at the other end, and a film guide interconnecting the two chambers and having an exposure aperture through which the film is exposed in a camera. The cartridge opening device has a stop means for engaging an end cap of the film supply chamber for preventing movement of the cartridge in one direction, a spindle on which the film spool in the take-up chamber of the cartridge may be slidably mounted, and means for moving the spindle and film spool relative to the cartridge for breaking open the cartridge. A pawl mechanism cooperates with the cartridge during the breaking operation to rotate the end cap of the take-up chamber of the cartridge into an end cap discharge position, to releasably hold the end cap while the film spool is withdrawn therefrom, to apply a force to the cartridge when the cartridge-opening cycle is initiated to assure engagement of the cartridge with its support, and to eject the remaining broken portion of the cartridge following the breaking operation. Upon removal of the cartridge, film retaining means retain the film spool on the spindle in position to be unwound for splicing.

One of the objects of the present invention is to provide a film cartridge opening device for breaking open a cartridge to obtain the film spool contained therein, disposing of the broken parts of the cartridge, and retaining the film spool in position to permit unwinding of the film and backing paper in preparation for a splicing operation.

Another object of the invention is to provide a film cartridge opening device that is of simple design and construction, thoroughly reliable and efficient in operation, and economical to manufacture.

Objects and advantages other than those set forth above will be apparent from the following description when read in connection with the accompanying drawings.

BRIEF DESCRIPTION OF THE DRAWINGS

In the drawings:

FIG. 1 is a segmental view in perspective of a film splicing mechanism in which the cartridge opening device of this invention is incorporated;

FIG. 2 is a side elevational view of the film cartridge opening device of FIG. 1 in its normal position;

FIG. 3 is an end elevational view of the film cartridge opening device of FIG. 2;

FIG. 6 is a perspective view similar to FIG. 1 showing the film spool after the cartridge has been broken, and partially unwound in preparation for splicing; and FIG. 7 is a segmental perspective view of a portion of the cartridge opening device showing an adapter mounted on the support bar to support and accommodate a different size film spool.

DESCRIPTION OF THE PREFERRED EMBODIMENT

Figure 4:
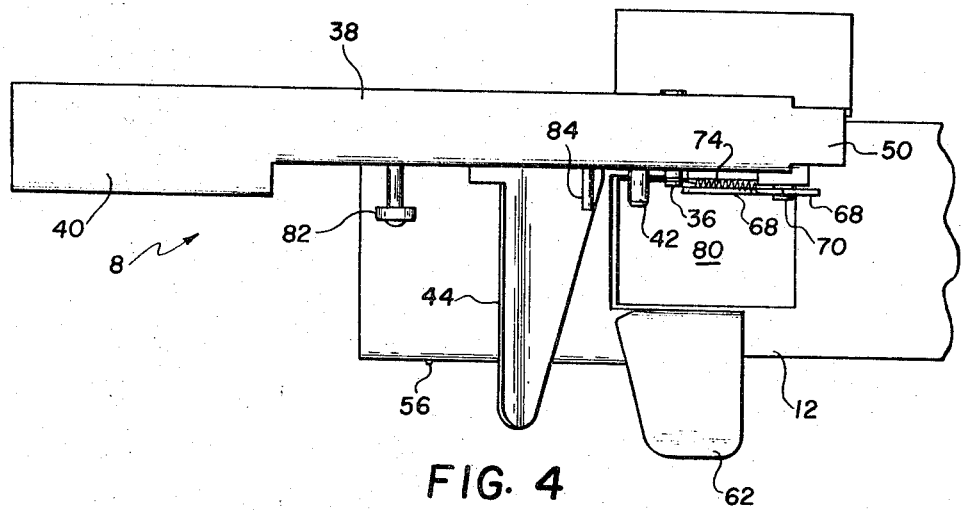
FIG. 4 is a top plan view of the film cartridge opening device of FIG. 2.

Referring to the drawings, a film splicing mechanism 10 is shown having tables 12, 12' for supporting the ends of two film strips, not shown, the tables being reciprocably movable for bringing film ends into abutting relationship for splicing. A carriage 14 shown in part for supporting a knife mechanism, a tape dispenser and a pressure roller 16 is mounted by any suitable means for reciprocal movement in a direction perpendicular to movement of the aforementioned tables 12, 12'. A tape-roll carriage, not shown, reciprocates within the knife carriage for stripping the paper from the roll and placing the tape over the film ends. A splicing mechanism of the general type referred to is disclosed in detail in U.S. patent application Ser. No. 662,685 filed on Aug. 23, 1967 by Robert E. Poole and Donald J. Arganbright entitled "Strip Splicing Device." Since the present invention is directed to a film cartridge opening device 8 incorporated in or for use with a film splicing mechanism 10, a more complete description of the splicing mechanism is not believed necessary.

A cartridge 18 of the type to be broken is well known in the art and is shown dotted in FIG. 2. The cartridge comprises a film supply chamber 20 at one end having a cylindrical supply end cap 22, a film take-up chamber 24 at the other end having a cylindrical take-up end cap 26, and a film guide 28 interconnecting the two chambers, a film spool 30 (see FIG. 3) is mounted within the take-up chamber 24 and a bore 32 at one end of spool 30 is accessible through an opening in one end of the take-up chamber 24.

The film cartridge opening device 8 comprises a support frame 34 secured to splicing mechanism 10 for supporting a stub shaft 36 about which a U-shaped lever 38 is pivotally mounted as best seen in FIGS. 2 and 3. The lever 38 has a handle 40 by which the lever may be pivotally moved, and a film spool receiving spindle 42 mounted near pivot shaft 36 to provide a mechanical advantage for breaking open a cartridge 18.

A support mechanism for cartridge 18 comprises a support bar 44 secured to frame 34 over which the end cap 20 of a film cartridge is positioned and supported as best seen in FIG. 2. The edge 46 of support bar 44 forms a stop means to prevent movement of cartridge 18 to the right as seen in FIG. 2. The opposite end of the cartridge is supported by sliding the film spool 30 contained in the cartridge chamber over spindle 42 with the spindle entering the bore 32 in the film spool. A spring 48 encircling pivot 36 biases lever 38 in a clockwise direction causing a flange 50 on lever 38 to engage an adjustable stop 52. By properly adjusting stop 52, the spindle 42 may be properly positioned relative to support bar 44 so that when a cartridge 18 is mounted on support bar 44, spindle 42 will enter bore 32 in the firm spool 30 and the supply end cap 22 of the cartridge 18 will engage edge 46 of support bar 44.

A cartridge and film spool retaining mechanism is positioned below support bar 4, and comprises a retaining plate 54 pivotally mounted on pins 56 secured to splicer table 12 as best seen in FIGS. 2 and 3. A spring 58 biases the retaining plate 54 in a counterclockwise direction to a normal retaining position causing a shoulder 60 (see FIG. 3) formed on a handle 62 to provide a stop for cartridge 18 to prevent removal thereof once it is mounted on its cartridge opening device. The plate 54 further has a pair of spaced tabs 64 as best seen in FIG. 3 which, in the normal position of plate 54 engage peripheral grooves 66 in the end flanges of film spool 30 for releasably holding the film spool on spindle 42 after cartridge 18 has been broken and the broken parts removed. To initially load a film cartridge 18 on device 8, the retaining plate 54 is manually moved downwardly by handle 62 to an unretaining position permitting film spool 30 in cartridge 18 to be moved onto spindle 42.

A pawl mechanism is provided to cooperate with cartridge 18 during the breaking operation to urge the cartridge onto support bar 44, partially rotate the broken-off end cap 26, assure separation of the film spool 36 and end cap 26, and eject the largest portion of cartridge 18. The pawl mechanism comprises a pawl 68 slidably mounted on a pin 70 secured to support frame 34 and extending through an elongated slot 72 in pawl 68. A spring 74, having one end connected to pawl 68 and its opposite end connected to pivot 36, initially urges pawl 68 generally to the left as seen in FIG. 2 causing pin 70 to engage one end of slot 72, and then moves pawl 68 in a counterclockwise direction into engagement with an adjustable screw 76. By adjusting screw 76, the end of pawl 68 is movable relative to the adjacent end of cartridge 18.

Figure 5:
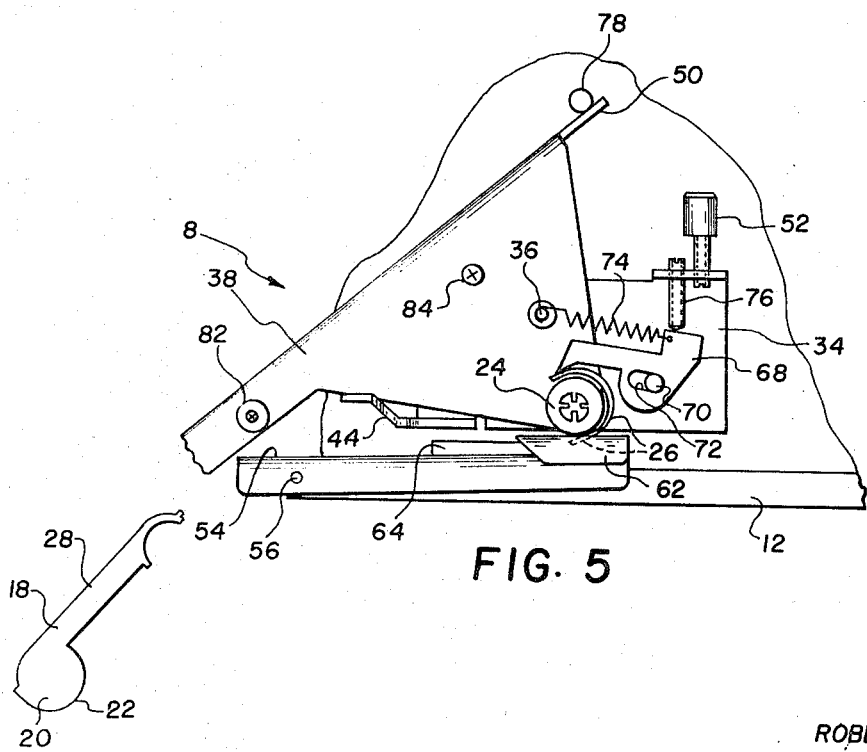
FIG. 5 is a segmental side elevational view similar to FIG. 2 of the film cartridge opening device showing the device in a cartridge breaking position.

In the operation of this invention, the spool retaining plate 54 is initially moved downwardly and a cartridge 18 placed in device 8 with film spool 30 at one end of the cartridge sliding onto spindle 42 and the opposite end of cartridge 18 resting on support bar 44 with supply end cap 22 in engagement with edge 46 thereof. The lever arm 38 is manually moved downwardly in a counterclockwise direction from its normal position as seen in FIG. 2 causing spindle 42 to move film spool 30 generally to the right subjecting cartridge 18 to tension by virtue of the supply cap end 22 of cartridge 18 engaging the support bar 44 and being stopped thereby. Such initial movement of lever 38 causes pawl 68 to engage cartridge 18 and apply a force thereto tending to hold the cartridge in engagement with support bar 44. Continued movement of lever 38 and spindle 42 to a cartridge breaking position in engagement with a stop pin 78 as seen in FIG. 5 breaks cartridge 18 at the film spool end where the take-up end cap 26 is joined to the body of cartridge 18. The broken take-up end cap 26 urges pawl 68 to the right against the bias of its spring 74. The end of pawl 68 partially rotates end cap 26 in a counterclockwise direction as cartridge 18 is broken to properly position it for discharge through an opening 80 in the table therebelow. Also, as lever 38, spindle 42 and film spool 30 are returned to their normal position, pawl 68 holds the take-up end cap 26 separating the end cap from film spool 30. The separating action is assisted by tab 64 on retaining plate 54 which forms a stop for the lower end of the take-up end cap 26 preventing it from returning with film spool 30. In addition, following the breaking of cartridge 18, pawl 68 which is initially moved by spindle 42 and end cap 26 to the right by virtue of the pin 70 and slot 72 connection, tensions spring 74, and upon return of spindle 42 and discharge of end cap 26, pawl 68 is urged by the tensioned spring 74 into engagement with the larger portion 20, 28 of cartridge 18 for ejecting the portion from support bar 44. The ejected cartridge portion 20, 28 is guided through an opening, not shown, by a cylindrical guide 82 and a pin 84 secured to lever 38 for engaging the upper surface of cartridge portion 20, 28 following the cartridge breaking operation. Upon return of lever 38 to its normal position, the end flanges of spool 30 engage tabs 64 on retaining plate 54 as best seen in FIG. 3 for retaining film spool 30 on spindle 42. The film spool is retained on spindle 42 until the film has been unwound for splicing. After the film has been unwound, spool retaining plate 54 is manually depressed to permit removal of spool 30 and film backing paper from spindle 42. To permit the splicing of film from a film spool 86 of a narrower width such as 135 mm. film, an adapter 88 is mounted on support bar 44 by virtue of an axially extending peripheral groove 90 in adapter 88 receiving the edge 46 of support bar 44 as seen in FIG. 7. The film spool 86 is then positioned in the depression formed by support bar 44 and adapter 88 and the film unwound to ride over adapter 88 and under support bar 44 and into the splicing mechanism 10 for splicing.

The invention has been described in detail with particular reference to a preferred embodiment thereof, but it will be understood that variations and modifications can be effected within the spirit and scope of the invention.

I claim:

1. In a device for breaking open a cartridge to obtain the film spool contained therein, the combination comprising:

means for supporting a cartridge containing a film spool;

stop means for said cartridge to prevent movement of said cartridge in one direction;

means for moving the film spool from a normal position generally in said one direction relative to the cartridge for breaking the cartridge in at least two parts and then returning said film spool to its normal position; and means cooperating with said cartridge when said film spool is moved for separating one of said parts of said cartridge from said film spool upon return movement of said film spool to its normal position.

2. The invention according to claim 1 wherein said separating means comprises a pawl movable on a pin.

3. The invention according to claim 2 wherein said pawl has an elongated slot for receiving said pin.

4. The invention according to claim 1 wherein said separating means comprises a pawl having an elongated slot for receiving said pin, and a spring for biasing said pawl in a counterclockwise direction, said pawl further ejecting one of said cartridge parts.

5. The invention according to claim 1 wherein said moving means comprises a lever, and a spindle on said lever for receiving the film spool of said cartridge when said cartridge is mounted on said supporting means, and said separating means comprises a pawl movable on a pin.

6. The invention according to claim 5 wherein said lever is mounted for pivotal movement.

7. In a device for breaking open a cartridge to obtain the film spool contained therein, the combination comprising:
- means for supporting a cartridge,
- said supporting means comprising a support bar over which one end of said cartridge extends, said support bar forming a stop for said cartridge to prevent movement of said cartridge in one direction,
- means for receiving the film spool when the cartridge is mounted on said supporting means;
- means for moving said receiving means from a normal position generally in said one direction relative to said cartridge for breaking said cartridge in at least two parts, and then returning said receiving means to its normal position;
- means cooperating with said cartridge when said receiving means is moved for separating one of said parts from said film spool upon return movement of said receiving means to its normal position; and
- means for retaining said film spool on said spindle after said parts of said cartridge have been removed.

8. The invention according to claim 7 wherein said retaining means comprises a tab engageable with a portion of said film spool.

9. The invention according to claim 8 wherein said retaining means comprises a spring for biasing said tab toward said film spool.

10. The invention according to claim 7 wherein said separating means comprises a pawl movable on a pin, said receiving means comprises a spindle, and said moving means comprises a pivotal lever to which said spindle is secured.

References Cited
UNITED STATES PATENTS

| | | | |
|---|---|---|---|
| 3,226,816 | 1/1966 | Wilson et al. | 29—200X |
| 3,325,889 | 6/1967 | Meli et al. | 29—200 |
| 3,411,682 | 11/1968 | Leader et al. | 225—93 |

THOMAS H. EAGER, Primary Examiner

U.S. Cl. X.R.

225—93